Nov. 22, 1960   J. H. FORD   2,961,582
LOAD PICKUP REPEATING CIRCUIT INTERRUPTER
Filed May 6, 1957
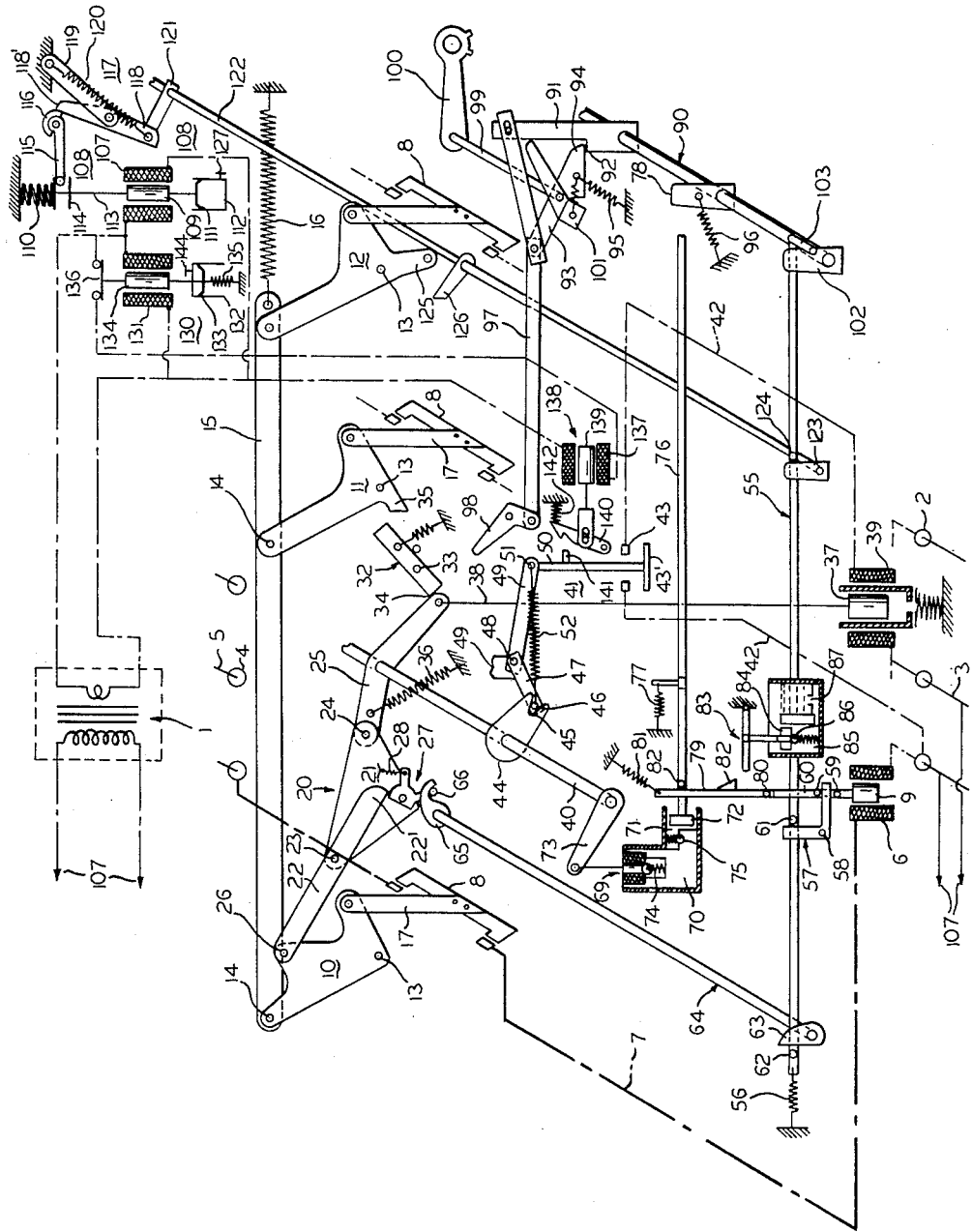
INVENTOR.
JOHN H. FORD
BY
*Ralph D. Hohenfeldt*
ATTORNEY United States Patent Office 2,961,582
Patented Nov. 22, 1960

2,961,582
LOAD PICKUP REPEATING CIRCUIT
INTERRUPTER

John H. Ford, Kansas City, Mo., assignor to McGraw-Edison Company, Milwaukee, Wis., a corporation of Delaware Filed May 6, 1957, Ser. No. 657,250
7 Claims. (Cl. 317—22)

This invention generally relates to circuit interrupters that open in response to the flow of excess current and automatically reclose a predetermined number of times until the overload current ceases or until the interrupter locks open. More particularly, the invention relates to a polyphase interrupter of this class modified so that it also responds to disappearance of voltage from a power line by automatically disconnecting its load after a selected time interval and by reconnecting its load after another time interval following restoration of voltage on the line.

In a distribution system comprising a main line supplied from one or more power sources and a number of connected branch circuits supplying individual loads, if the source of power is lost for even a short time, loss of load diversity may be so great that the total load cannot be reenergized at one time without first sectionalizing the system into lesser load increments, and then reenergizing these consecutively. By loss of diversity is meant that the various electric power consuming appliances connected to the system all demand power at the same time instead of periodically or at random as is the case under normal operating conditions. Thus, when power is restored after an outage, there is a high inrush current which tends to subside only after the charging current has been supplied and the various appliances have had an opportunity to complete an operational cycle, whereupon diversity is regained.

When all of the branch lines being fed from a main circuit are energized simultaneously, the summation of high inrush currents in the individual lines raises a number of serious problems. Among them is that the automatic circuit breakers interposed between the sources and the main lines sense the inrush current as a flow of fault current, thereby causing the breakers to open and perpetuate the outage. In aggravated cases it is necessary to separate a distribution system into sections and energize these one by one in order to avoid exceeding the minimum trip rating of the protective circuit breakers.

One well known scheme for sectionalizing a power system after an extended outage uses specialized automatic sectionalizing switches that are arranged in series and adapted to close sequentially so that each line section is able to attain steady state conditions, or load diversity, before the next adjacent line section is energized. Another scheme uses a sectionalizing switch in each branch circuit and provides the switches with a time delayed reclosing mechanism that permits setting the various switches for reclosing at predetermined or random time intervals. The time intervals must, of course, be such that the first branches to be energized will attain steady state conditions before the next subsequent branch is energized.

The present invention proposes to achieve the results set forth in the preceding paragraph by modifying a polyphase repeating circuit interrupter so that it not only carries on its normal fault protective function but it also acts as a load pickup switch. The polyphase circuit interrupter chosen for illustrating the invention is set forth in great detail in the copending application of A. Van Ryan et al., Ser. No. 379,046, filed September 8, 1953, now Patent No. 2,804,521, and assigned to the same assignee as this invention. The circuit interrupter referred to in the cited application is of the fluid immersed type where most, if not all, of the mechanism is self-contained within a metal tank. This type of polyphase repeating circuit interrupter is commonly known as a recloser and will be so designated in this application for the sake of brevity.

It is a primary object of this invention to provide a recloser that facilitates reconnecting electrical loads in increments following loss and restoration of source voltage.

Another object of this invention is to provide a recloser that automatically opens and recloses in response to a temporary fault and that locks open if the fault is permanent, and, in addition, that automatically disconnects its load from the source if source voltage is lost for a predetermined time and reconnects its load after voltage is restored for a predetermined time.

A further object is to provide an auxiliary tripping arrangement which independently trips the recloser when source or line voltage is not available and which auxiliary equipment is simple and compact and adapted to fit within a recloser tank without sacrificing the self-contained features. Supplementary to this object is the provision of auxiliary tripping apparatus which does not interfere with the normal protection duty of the recloser.

It is a general object of this invention to provide an improved load pickup recloser, and more specific objects will appear periodically throughout the course of this specification.

A more detailed description of the recloser modified for load pickup duty will be set forth in connection with the following drawing in which the single figure schematically illustrates the principal components of a polyphase recloser, such as that shown in the cited Van Ryan application, and also includes additional components which impress the recloser with load pickup features.

Before entering into a discussion of the improvements constituting the instant invention, the conventional fault protective features of a recloser will be outlined in reference to the figure. It will be understood that with exception of the control circuit transformer 1, that all the components shown in the figure are housed in a metal tank, not shown, that supports source side insulating bushing 2, for connecting polyphase source wires 3 to the recloser and load side bushings 4, for connecting the recloser to the load wires 5. In each phase between the source bushing 2 and load bushing 4 there is a series circuit consisting in an overload responsive relay coil 6, heavy lead wires 7 and a main interrupting switch 8. Only one of the overload relay coils 6 is shown, but it will be understood that there is one such coil 6 in each phase and that each is connected in series with an interrupting switch between a source wire and a load wire in its corresponding phase. When series coil 6 is traversed by minimum trip current, that is, usually twice rated load current of the recloser, the coil attracts a solenoid armature 9 downwardly and effects overload tripping of the recloser by means to be described shortly hereinafter.

Each interrupting switch 8 is carried on associated bell cranks 10, 11 and 12, each of which is somewhat different in configuration. The respective bell cranks are adapted to rotate through a limited angle on stationary pivots 13. All of the bell cranks are further pivotally connected at 14 to a common power bar 15 which has attached at one end a switch opening spring 16.

When the recloser is in closed circuit condition, as illustrated in the figure, opening spring 16 exerts a strong influence on power bar 15 which in turn tends to rotate bell cranks 10, 11 and 12 in a clockwise direction to thereby cause downward movement of the interrupter switch insulating links 17 and joint opening of switches 8. However, such opening action is normally prohibited by a general latch means or toggle link assembly, generally designated by the reference numeral 20. The toggle link assembly comprises two members one of which, 21, has a triangular configuration and the other of which 22 is elongate and pivotally joined at 23 to the triangular link 21. Triangular link 21 is pivotally connected at 24 to a normally latched rocking lever 25. The elongate link 22 is in turn pivotally connected to bell crank 10 at 26 and the links are normally held rigidly with respect to each other and in opposition to the influence of opening spring 16 by means of a semi-circular shaft 27 that is biased in a counterclockwise direction by means of a small spring 28. It will be obvious from inspection of the drawing that if a slight clockwise rotation is imparted to the semi-circular shaft 27, the tip 22' of elongate link 22 will pass the flat side of the semi-circular shaft 27 and the toggle link mechanism 20 will collapse under the influence of opening spring 16. Upon this event power bar 15 moves to the right and causes clockwise rotation of the bell cranks 10, 11 and 12 and opening of the interrupting switches 8.

When the toggle link assembly 20 collapses and the bell cranks 10, 11 and 12 rotate to open their interrupting switches 8, rocking lever 25 remains stationary temporarily because it is normally latched by a spring-biased lever 32 carried on a fixed pivot 33 and engaged at 34 with an end of the rocking lever. However, when the center bell crank 11 has nearly completed its clockwise rotation during switch opening, a short arm 35 thereof strikes latch lever 32 and releases rocking lever 25 for counterclockwise rotation under the influence of a tension spring 36. This elevates a resetting electromagnet plunger 37 that is shown connected to the rocking lever 25 by means of a long insulating link schematically represented as 38. Counterclockwise rotation of rocking lever 25 immediately aligns triangular link 21 of the toggle link assembly 20 with elongate link 22 and allows its tip 22' to move upwardly past the flattened side of semi-circular shaft 27 and to catch again on the edge of the outer periphery of the shaft 27 as shown in the figure. This restores the toggle link assembly to a rigid condition but in a lower position so that when rocking lever 25 is subsequently rotated through a clockwise angle by descent of plunger 37, the toggle assembly 20 will drive bell crank 10 and the others 11, 12, in a counterclockwise direction and thus urge power bar 15 to the left again. This not only raises the respective interrupting switches 8 to their closed circuit position but reloads the opening spring 16 in preparation for another opening operation.

It will be observed that toggle link mechanism 20 collapses during switch opening but rocking lever 25 is held securely until latch arm 32 is struck by short arm 35 on bell crank 11, whereupon arm 25 rotates counterclockwise through about ninety degrees under the influence of spring 36. The reason for this is to take the weight of resetting magnet plunger 37 off the main switch opening spring 16 so that the latter's full force may be expended entirely in opening the switches 8.

Resetting of the switches 8 is achieved through retracting resetting magnet plunger downwardly through the agency of electromagnet coil 39. Coil 39 is in circuit with an auxiliary switch, designated generally by the reference numeral 41, that closes the coil 39 circuit when the plunger is in its uppermost position and re-opens the coil circuit when the plunger 37 is down as in the figure. In other words, plunger 37 executes a switch resetting stroke and coil 39 is then automatically diconnected.

Coil 39 is supplied with full line voltage by being connected across incoming lines 3 through wires 42 which are in series with auxiliary switch contacts 43.

Auxiliary switch 41 is operated from a main rock shaft 40 to which the rocking lever 25 is rigidly affixed. When shaft 40 rotates through a limited angle after switches 8 open, it oscillates an arm 44 through a like angle counterclockwise for actuating switch 41 from open position, as shown, to a closed position. For this purpose arm 44 is slotted at 45 for loosely and slidably receiving a pin 46 that is carried by a link 47. The latter link 47 is pivoted on a stationary pin 48 carried on a bracket 49 and on the same pin 48 there is also pivotally supported another link 49 to which an insulating switch rod 50 is pinned at 51. Links 47 and 49, together with a spring 52 constitute an over-center linkage for operating switch 41 with a snap action.

It will be seen that when arm 44 is rotated counterclockwise, pins 46, 48 and 51 will first form a straight line coincident with line of action of spring 52 which will then be stretched and pre-loaded. As sliding pin 46 is carried further counterclockwise, spring 52 is able to contract and lift link 49 in a counterclockwise direction, whereupon contacts 43 are bridged and coil 39 is temporarily energized. Plunger 37 is immediately drawn downward by coil 39 and switch 41 is then opened by an action of over-center spring 52 converse to that just described. Latch 32 again engages rocking lever 25 to hold plunger 37 down. The switches 8 are now reset.

As briefly mentioned earlier, tripping of the recloser in response to overloads is initiated by any of the series overload relays 6 being traversed by more than minimum trip current so that its associated magnetic armature 9 will be attracted into the coil. In order to transfer the motion of the descending armature 9 to the toggle link mechanism 20 and thereby effect its collapse, there is provided a common trip bar 55 which is normally biased to the left by means of an anchored spring 56. Each overload relay armature 9 is adapted to shift trip bar 55 to the right in opposition to spring 56 by means of an L-shaped lever 57 carried on a fixed pivot 58. One end of lever 57 is disposed between two spaced fixed pins 59 carried on a vertical rod 60 attached to overload relay armature 9. The other end of lever 58 stands adjacent a pin 61 which extends laterally from trip bar 55. At the far left end of trip bar 55 there is another laterally extending pin 62 disposed in the path of a short lever 63 which is rigidly affixed to a toggle latch trip shaft 64. Trip shaft 64 has a short hook-shaped lever 65 affixed to one of its ends so that when the shaft is rotated clockwise, lever 65 strikes a laterally extending ear 66 attached to the semi-circular toggle latch 27. It is evident that downward movement of overload relay armature 9 in response to overloads causes rotation of trip shaft 64 and in turn causes rotation of semi-circular shaft 27, thus enabling toggle link assembly 20 to collapse and allow opening of the main interrupting switches 8.

Although it is only incidental to the present invention, the recloser is also provided with lockout means for permanently holding the main interrupter switches 8 open following a predetermined number of closely successive opening and reclosing operations. For this purpose there is provided a schematically represented mechanism including pump piston 69 that is adapted to descend and displace a measured quantity of fluid from a cylinder 70 into another cylinder 71 which houses a slidable integrating or counting piston 72. The pump piston is driven through a lever 73 carried by rock shaft 40. Since shaft 40 rotates through an angle each time the recloser operates, pump piston 69 executes corresponding strokes and hydraulically advances the integrating piston 72 to the right in a step-by-step manner. The pump piston 69 is provided with a ball check 74 and the integrating piston cylinder is likewise provided with a ball check 75 for the purpose of controlling and slowing retraction of the integrating piston 72 when it has been advanced to the right during a series of closely successive recloser operations. If the recloser executes its total number of operations, usually four, or if it executes a lesser number and then remains in a closed circuit condition, integrating piston 72 will resettle to its initial position as depicted in the figure. This is brought about by providing the lockout stem 76 with a return spring 77 that ultimately causes resettling of integrating piston.

When integrating piston 71 has moved four steps under hydraulic influence, stem 76 strikes a lockout lever 78 with consequences to be described shortly hereinafter.

The illustrative recloser also has dual time current characteristics. That is, the recloser is adapted to open instantaneously on the first of a series of opening operations and then to open with a time delay on subsequent operations prior to lockout. To accomplish this, the upper section 79 of overload relay link 60 is hinged on a pin 80 and biased clockwise by means of an angularly disposed spring 81 but is normally prohibited from such rotation by bearing on a laterally extending pin 82 carried by the lockout stem 76. Thus, during the initial recloser operations, link section 79 plunges almost directly downwardly along with overload armature 9, but as trip stem 76 advances to the right, section 79 leans to the right under the influence of spring 81 until a tooth 82 on link section 79 overhangs and engages a time delay arm 83.

The time delay arm 83 is hinged on a fixed pivot and intermediate its ends it is further attached to a vertical link that connects with a time delay piston 84. Piston 84 strokes in a hydraulic cylinder 85 and is retarded in its downward movement by a ball check 86 and by the displacement of hydraulic fluid through a metering orifice 87. It will therefore be evident that when the tooth 82 engages time delay arm 83, usually after two recloser operations, that the descent of overload armature 9 will be retarded between initiation of the flow of fault current and tripping of the interrupter.

The recloser may be locked open automatically or manually. In either case lockout is achieved by tripping the main switch toggle 20 and depressing auxiliary switch 41 open so that resetting magnet coil 39 cannot be energized. For automatic lockout trip stem 76 advances in a step-by-step manner until it strikes lockout lever 78 which rotates lockout shaft 90 through a small clockwise angle. This also throws a shouldered latch lever 91 to the right through a small clockwise angle. When lever 91 rocks to the right, its shoulder 92 releases the tip 94 of a latch lever 93 which is biased for clockwise rotation by a spring 95 that exerts a greater force than another spring 96 which tends to maintain the shoulder 92 in latching engagement with tip 94. When the tip 94 is released from shoulder 92, latch lever 93 rotates clockwise and translates a long link 97 longitudinally to the right. This causes a depressing lever 98 to rotate in a counterclockwise direction and bear directly on link 49 of the auxiliary switch mechanism 41. Auxiliary switch bridging bar 43' is thus held away from contacts 43 so the resetting coil 39 cannot be energized until the lockout mechanism is reset in a manner now to be described.

When the recloser locks out in the manner just outlined, a manual operating shaft 99 extending exterior to the recloser tank executes clockwise rotation through an angle of approximately 90 degrees and turns a manual operating, eyeleted, handle 100 thus indicating that the recloser is open. When handle 100 is restored to the horizontal position in which it is depicted in the figure, it causes the end 94 of collapsed lever 93 to wipe lever 91 and thereby rock the latter slightly clockwise until tip 94 re-engages with the shoulder 92. The recloser is then prepared to execute a repetition of the described opening and reclosing operations, because auxiliary switch 41 may then close under the influence of over-center spring 52.

The recloser may also be locked open manually by rotating operating handle 100 through a clockwise angle of approximately ninety degrees. Through rotation of a lever 101, latch lever 91 is again rocked slightly clockwise for releasing latch tip 94.

When manual lockout is effected by rotation of operating handle 100 as just described, auxiliary switch 41 is, of course, depressed to an open condition. However, the main toggle assembly or general latch means 20 must likewise be broken in order to open the main switches 8. For this purpose lockout shaft 90 is provided with an arm 102 that extends into the path of a laterally extending pin 103 carried by the trip bar. Hence, when lockout shaft 90 is rotated, arm 102 strikes pin 103 and moves the trip bar 55 to the right in a manner similar to the case where the overload relays act on the trip bar and with the same consequences. That is, toggle link assembly 20 is caused to collapse and allow opening of the main switches 8 under the influence of opening spring 16.

The description has thus far demonstrated how the recloser may be opened in response to occurrence of an overload or manual operation. It will be recalled that during occurrence of an overload, energy is derived from series relay 6 for shifting trip bar 55 to the right and thereby causing collapse of the toggle link mechanism 20. For reasons which were explained in the introductory paragraphs of this specification, it is desirable that the interrupter be opened not only during occurrence of a fault, but also in response to failure of power on the source wires 3. This invention provides means for tripping the recloser in the absence of available power from the source. The specification will now proceed with a description of a novel stored energy mechanism for moving the trip bar 55 and tripping the recloser open after a predetermined time delayed period following disappearance of voltage from the source wires 3 and for reclosing the recloser a predetermined period following restoration of power on the source wires 3. By this means, when a number of such reclosers are used to supply individual branch lines from a main circuit, or, when they are arranged in series between power line sections, the various reclosers can be reclosed sequentially, after an outage, and thereby reenergize the load in increments.

The apparatus added to the recloser for controlling opening and reclosing in the event of loss of power on the source includes a potential transformer 1 whose primary is connected to one phase of the source wires 3 by means of leads 107 which are shown broken off at terminal arrows but whose ends are identified by identical reference numerals. The secondary of transformer 1 supplies a coil 107 of a symbolized time delay relay, generally designated by the numeral 108, with a reduced voltage during periods when the source is alive. Relay coil 107 is provided with a magnetic plunger 109 that is normally attracted and held in its illustrated position in opposition to a resettling compression spring 110. Spring 110 does not have sufficient strength to depress magnet plunger 109 when the coil 107 is energized, but when the coil is deenergized, the spring forces the plunger and a time delay piston 111 downwardly in a dashpot 112. The time delay piston 111 resists downward movement, but it moves upward freely and without time delay when relay coil 107 is reenergized. Stem 113, attached to plunger 109, is provided with a pair of schematically represented axially spaced discs 114 between which are disposed the end of a latch lever 115. Latch lever 115 is provided with an attached semi-circular shaft portion 116 which when in the figure position maintains a toggle link assembly 117 in a rigid condition and permits the recloser to remain closed.

The toggle link assembly 117 is comparable in construction to the main switch toggle link assembly 20. That is, it comprises a long link 118 that has a latching tip 118' bearing in light frictional relation against semicircular shaft 116. At the mid portion of long link 118 there is pivotally connected another shorter link 119 whose one end is carried on a fixed pivot. Links 118 and 119 are biased toward jackknifing with respect to each other by a toggle spring 120. The lower end of long link 118 is pivotally connected to a short trip lever 121 that is carried rigidly on a shaft 122. The bearings for shaft 122 are not shown. When time delay plunger 109 settles downwardly in the absence of power on the source, that is, after the time delay following deenergization of coil 107, latch lever 115 rotates through a small counterclockwise angle which causes semicircular shaft 116 to release the tip of toggle link 118 and thereby cause collapse of the toggle assembly 117. Under the influence of toggle spring 120, this imparts a quick clockwise rotation to a trip lever 121 and shaft 122.

Shaft 122 is provided at its end near the bottom of the figure with an arm 123 that extends into adjacence with a pin 124 projecting laterally from the trip bar 55. It will therefore be evident that clockwise rotation of shaft 122 urges trip bar 55 to the right with a consequent collapse of main switch toggle 20 and opening of the interrupter switches 8 even in the absence of power.

The toggle link assembly 117 is reset immediately, following opening of the recloser, by a short arm 125 on bell crank 12 that swings through a clockwise angle when the switch 8 opens and strikes a lever 126 carried on shaft 122. This imparts a counterclockwise rotation to shaft 122, opposite of its tripping rotation, and thereby causes resetting of the toggle assembly 117.

The aforegoing paragraphs have explained how the recloser may be tripped open after a time delay period following disappearance of voltage from the source wires 3. The amount of time that lapses between loss of voltage and tripping is a discretionary matter governed by the nature of the system being supplied by way of a plurality of load pickup reclosers such as here illustrated. It is usually preferable to establish the same tripping time for each recloser on the assumption that load diversity will be lost only if power is not available to the whole system for a predetermined time. If little time lapses between loss of voltage and restoration of voltage, the whole system may be energized simultaneously without serious inrush current flowing, so it is not necessary to open the reclosers and to reclose them at spaced intervals or random. In the illustrative time delay tripping relay 108, tripping time may be controlled by means of a needle valve 127.

Another time delay device, generally designated by the reference numeral 130, is provided for assigning a selected reclosing time delay to each recloser in the system. The closing time delay must be coordinated with other similar reclosers supplying the individual loads which are to be reconnected at various time intervals. The coil 131 of the reclosing time delay relay is directly connected across the secondary of the control transformer 1. The dashpot 132 and time delay piston assembly 133 in this instance is adapted to allow instantaneous dropping of time delay plunger 134 as soon as voltage disappears from the source 3. This is achieved by a tension spring 135 which attracts the dashpot cylinder 133 downwardly when the magnetic influence of coil 131 disappears. Time delay of this relay is imposed only after restoration of power, that is, by slow upward attraction of plunger 134 after coil 131 is reenergized.

Time delay assembly 130 controls a contact 136 that is in circuit with the coil 137 of a blocking relay, generally designated by the reference numeral 138. During normal recloser operation, blocking relay coil 137 is energized through contact 136 so that the blocking relay retracts its plunger 139 and causes disengagement of a hooked arm 140 from an appropriate latch projection 141 carried by the auxiliary switch link 50. As soon as source power fails, blocking coil 137 deenergizes and arm 140 is urged in a counterclockwise direction by means of a compression spring 142. This sets arm 140 in position for engaging the projection 141 so that auxiliary switch 41 cannot reclose when interrupting switches 8 open after the opening time delay.

When power is restored, auxiliary switch 41 is held in an open circuit position by the blocking relay 138 until the closing time delay device times out and closes its contact 136. This reenergizes the blocking coil relay 137 and causes the hooked arm 140 to release auxiliary switch link 50. Upon this event, the energy stored in the auxiliary switch over-center spring 52 causes the auxiliary switch 41 to close and reenergize the main resetting electromagnet 39. Resetting magnet plunger 37 is then attracted downward for closing switches 8, and the loads being supplied by various reclosers are again connected to the source. By adjusting the time delay of various reclosers on the system through needle valve 144 of the closing time delay device 130, the other reclosers may be made to reset at a different time interval and thereby place the load on the source in tolerable increments.

One of the principal advantages of the novel apparatus for converting the polyphase recloser to a load pickup recloser is that the additional elements such as the time delay devices 108 and 130 can be installed in the same tank as the other recloser mechanism. Due to the size of the control transformer 1, however, it is perhaps preferable to locate it exterior to the recloser tank.

Another important advantage of the invention is that it does not interfere with the recloser carrying on its normal duty of protecting a circuit against overloads. This is so because manual and overload tripping of the main switch toggle means 20 is carried on through a trip bar 55 which shifts to a non-interfering position away from arm 123 which actuates the trip bar upon failure of voltage. Moreover, the blocking relay 138 does not interfere with the normal operations of auxiliary switch 41 during overload operation since hooked latch 140 is retracted to a noninterfering position as long as voltage is maintained on the source wires 3.

In recapitulating the improvements that impress a polyphase recloser with ability to cope with loss of load diversity in a power system, we assume first that source lines 3 have been deenergized. After a delay period, time delayed relay 108 rotates arm 115 and effects collapse of toggle mechanism 117. Upon this event, trip bar 55 shifts to the right and causes rotation of tripping shaft 64 and unlatching of the main switch toggle assembly 20. The switches 8 then open under force from stored energy spring 16.

Even before the main switches 8 open in response to disappearance of voltage, blocking relay 138 is deenergized and auxiliary switch 41 is thereby restrained open, but biased toward closed position, during the ensuing outage.

When power is restored, opening time delay relay 108 immediately restores itself in condition for holding the collapsible toggle 117 in rigid condition. Closing time delay relay 130 then times out according to its setting and finally closes its contacts 136, thereby energizing the blocking relay 138 and liberating the auxiliary switch 41 for energizing the resetting magnet coil 39. The main switches 8 are then closed and the particular recloser under consideration reconnects its load to the system. Other similar reclosers take on their incremental loads after consecutive time delay intervals determined by their respective reclosing relay 130 settings.

Although the invention has been described in considerable detail in reference to one schematically represented recloser, this is not to be construed as limiting the invention to the particular recloser shown, for the invention may be embodied in other polyphase and single phase reclosers. Hence, the invention is to be interpreted according to the scope of the claims which follow.

It is claimed:

1. A load pickup recloser comprising main switch means for connecting an electric load to a power source, first latch means holding said main switch means closed under normal circuit conditions, spring means biasing said switch means toward open condition, overload relay means adapted to release said first latch means in response to overload and permit opening of the switch means, switch reclosing means rendered effective to reclose the main switch means immediately following opening of the latter, time delay relay means operatively coupled with the first latch means and adapted to release said first latch means and open the main switch means a predetermined time after voltage disappears from said source, means for blocking said switch reclosing means after voltage disappears from the source, and a second time delay means adapted to respond a predetermined time after voltage reappears on said source by rendering said blocking means ineffective, whereupon said main switches may reclose and reconnect the load to the source.

2. A load pickup recloser comprising main switch means connecting a load to a power source, switch opening means including a stored energy spring, means for rendering said spring effective to operate the opening means upon occurrence of an overload, electroresponsive switch reclosing means energized from the source each time the switch means open in response to an overload, first time delay means energized from the source and operatively coupled to the opening means for operating the opening means a predetermined time after voltage disappears from the source, electro-mechanical blocking means cooperating with the reclosing means and rendering the latter ineffective only in the absence of voltage on the source, a second time delay relay means responsive a predetermined period following return of voltage on the source by rendering said blocking means ineffective, whereupon said switch means may reclose and reconnect the load to the source.

3. A load pickup recloser comprising main switch means for connecting a load to a power source, means including an opening spring tending to open said switch means, first latch means normally holding said switch means closed in opposition to the opening spring, overload responsive trip means adapted to release said latch means and render said opening spring effective upon occurrence of an overload, electroresponsive switch reclosing means energized from said power source, auxiliary switch means operatively connected to said switch means for connecting said reclosing means when said switch means opens in response to a fault, a time delayed trip relay means normally energized from the power source and maintained in one position when source voltage is present and movable to another position after a time delay following loss of voltage on the source, said trip relay means being operatively coupled with and adapted to trip said first latch means when said relay moves between said positions, whereby said interrupter may trip open a predetermined time following disappearance of source voltage, electroresponsive auxiliary switch blocking means adapted to prevent switch reclosing when voltage reappears on said source, a second time delay means adapted to render said blocking means ineffective a predetermined time after voltage reappears on said source, whereupon said reclosing means becomes effective to reconnect the load to the source.

4. A load pickup recloser comprising main switch means connecting a load to a power source, switch opening means including a spring, first latch means normally holding said switch closed in opposition to the spring, overload relay means adapted to release said first latch means in response to an overload, electroresponsive means energized from the source for reclosing said main switch means, normally inactive auxiliary switch means in circuit with said electroresponsive means and adapted to connect the latter to the source when the main switch opens, a normally inactive second latch means operatively coupled to the first latch means, a control circuit including time delay relay means connected with the source of restraining said second latch means in one position and said relay means being adapted to move to another latch tripping position when power disappears from the source for a predetermined time, whereby both said latches trip and open said main switch means, said control circuit including blocking relay means adapted when deenergized to restrain said auxiliary switch open, a second time delay relay means in said control circuit for energizing said blocking relay means a predetermined time following reappearance of voltage on the source and thereby releasing said auxiliary switch for energizing said electroresponsive means to reconnect the load.

5. A load pickup polyphase recloser comprising main switch means in each phase for connecting an electric load to a power source, general latch means holding said switch means closed under normal circuit conditions, spring means biasing said switch means toward open condition, an over-load relay means including a coil in each phase serially connected with a corresponding main switch means, a movable transfer element operatively coupled with the general latch means and upon movement of the element in one direction tripping said general latch means to cause opening of the switch means, each overload relay means being coupled with said transfer means for opening the switch means upon occurrence of an overload, a resetting electromagnet in shunt with the source, an auxiliary switch in circuit with the electromagnet and adapted to be closed when said main switches open to thereby reclose the same and restore energy to the spring means, in combination with a second spring biased latch means coupled with said transfer means, a first time delay relay means supplied from said source and controlling said second latch means, said second time delay means being movable to release said second latch means a predetermined time following disappearance of source voltage whereupon said transfer means may be activated to release said general latch means and open said switch means, electroresponsive auxiliary switch blocking means effective to prevent switch reclosing after voltage reappears on the source, and another time delay relay means adapted to render said blocking means ineffective a predetermined time following reappearance of source voltage.

6. A load pickup polyphase recloser comprising main switch means connecting a load to a source, switch opening means including a stored energy spring, a collapsible toggle including a first latch holding said switch means open in opposition to the spring, trip means adapted to release said latch and open said switch means, an overload responsive relay in each phase and each independently actuating said trip means, a switch resetting means including an electromagnet energized from the source, a second spring biased toggle including a second latch, said second toggle being operatively coupled to the trip means and arranged to actuate said trip means upon collapse of the toggle, a control circuit connected to the source and including therein a first time delay relay adapted to operate said second latch and thereby open said main switch means a predetermined time after disappearance of source voltage, and means associated with the switch opening means for resetting said second toggle when said switch means open.

7. The invention according to claim 6 including an auxiliary switch for controlling said resetting electromagnet, an electroresponsive blocking relay adapted to prevent said auxiliary switch from energizing said electromagnet when the blocking relay is deenergized and a second time delay relay in said control circuit for energizing said blocking relay a predetermined time after return of voltage on the source, whereupon said main switch means may reclose and reconnect the load to the source.

References Cited in the file of this patent

UNITED STATES PATENTS

| 2,575,740 | Warrington | Nov. 20, 1951 |
| 2,721,300 | Myles | Oct. 18, 1955 |
| 2,813,170 | Horn | Nov. 12, 1957 |
| 2,852,638 | Stramowski | Sept. 16, 1958 |
| 2,870,289 | Kyle | Jan. 20, 1959 |

UNITED STATES PATENT OFFICE
CERTIFICATION OF CORRECTION

Patent No. 2,961,582                                  November 22, 1960

John H. Ford

It is hereby certified that error appears in the above numbered patent requiring correction and that the said Letters Patent should read as corrected below.

Column 9, line 70, for "of" read -- for --.

Signed and sealed this 2nd day of May 1961.

(SEAL)
Attest:

ERNEST W. SWIDER
Attesting Officer

DAVID L. LADD
Commissioner of Patents